United States Patent
Rojey et al.

[11] Patent Number: 5,877,361
[45] Date of Patent: Mar. 2, 1999

[54] PROCESS FOR RECYCLING A DISPERSING ADDITIVE USED FOR THE TRANSPORTATION OF A CONDENSATE GAS OR OF AN OIL WITH ASSOCIATED GAS IN THE PRESENCE OF HYDRATES

[75] Inventors: Alexandre Rojey; Michel Thomas, both of Rueil Malmaison, France; Anne-Sophie Delion, Paris; Jean-Pierre Durand, Chatou, all of France

[73] Assignee: Institute Francais du Petrole, Rueil Malmaison, France

[21] Appl. No.: 659,363

[22] Filed: Jun. 6, 1996

[30] Foreign Application Priority Data

Jun. 6, 1995 [FR] France .................... 95 06736

[51] Int. Cl.$^6$ .................................................. C07C 7/20
[52] U.S. Cl. ................... 585/15; 585/950; 95/153
[58] Field of Search .................. 585/15, 950; 95/153

[56] References Cited

U.S. PATENT DOCUMENTS

| | | | |
|---|---|---|---|
| 3,644,107 | 2/1972 | Clark | 48/190 |
| 4,456,067 | 6/1984 | Pinner, Jr. | 166/279 |
| 4,948,394 | 8/1990 | Rojey | 55/48 |
| 4,991,614 | 2/1991 | Hammel | 137/17 |
| 5,127,321 | 7/1992 | Larue et al. | 62/20 |
| 5,244,878 | 9/1993 | Sugier et al. | 507/90 |
| 5,473,775 | 12/1995 | Sugier et al. | 585/15 |

FOREIGN PATENT DOCUMENTS

| | | |
|---|---|---|
| 0178962 | 4/1986 | European Pat. Off. |
| 0323307 | 7/1989 | European Pat. Off. |
| 0442767 | 8/1991 | European Pat. Off. |
| 0571257 | 11/1993 | European Pat. Off. |
| 2618876 | 2/1989 | France |
| 88 10397 | 12/1988 | WIPO |

*Primary Examiner*—Walter D. Griffin
*Assistant Examiner*—Nadine Preisch
*Attorney, Agent, or Firm*—Antonelli, Terry, Stout & Kraus, LLP

[57] ABSTRACT

A process for transporting a fluid in a pipe under conditions where hydrates may form. In the process, the pipe fluid contains at least one of a gaseous hydrocarbon or liquid hydrocarbon and water and the water content is less than the liquid hydrocarbon content. The process includes the steps of 1) adding a dispersive additive in a hydrocarbon solution to the fluid to be transported, so as to form an emulsion, 2) transporting the liquid and gaseous hydrocarbons in the presence of water and the hydrates, 3) separating the gas phase, the hydrocarbon liquid in excess and a liquid hydrocarbon phase comprising the hydrates and the dispersing additive, and 4) separating the liquid hydrocarbon phase comprising the hydrates and the dispersing additives. The liquid hydrocarbon phase comprising the hydrates is separated by dissociating the hydrates to form a water-in-oil emulsion, the additives being solved in the oil or liquid hydrocarbon, and breaking the water-in-oil emulsion so as to obtain an aqueous phase and a liquid hydrocarbon comprising the additives. Finally the liquid hydrocarbon phase containing at least part of the dispersing additive from step 4, is recycled to a point in the pipe.

13 Claims, 2 Drawing Sheets

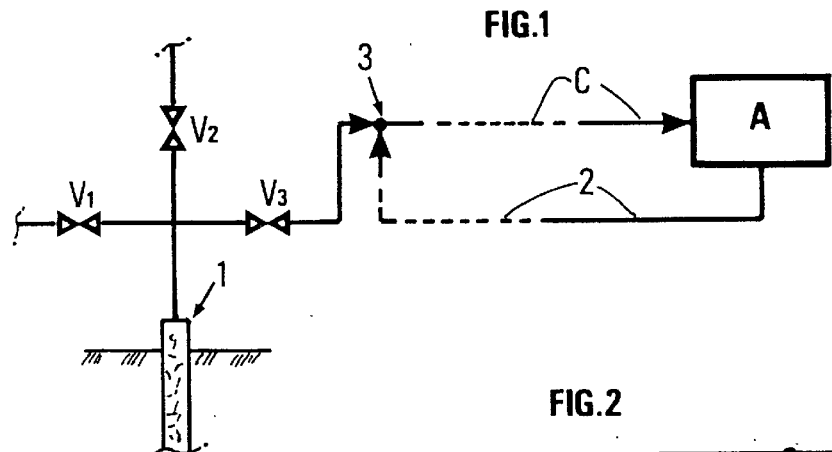
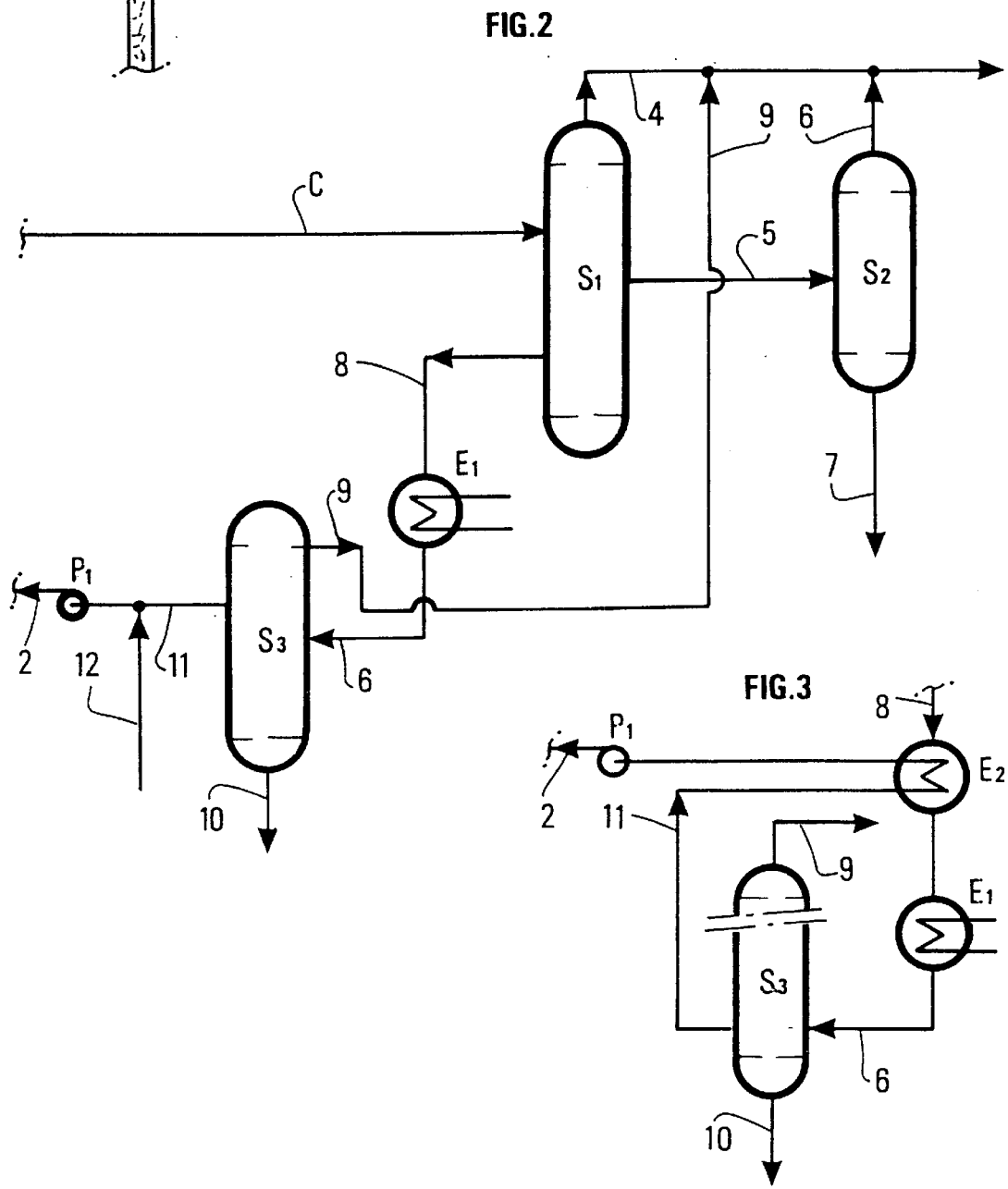

PROCESS FOR RECYCLING A DISPERSING ADDITIVE USED FOR THE TRANSPORTATION OF A CONDENSATE GAS OR OF AN OIL WITH ASSOCIATED GAS IN THE PRESENCE OF HYDRATES

FIELD OF THE INVENTION

The present invention relates to a process allowing to recycle all or part of a hydrate dispersing additive used for the transportation of a condensate gas or of an oil with associated gas, under conditions where gas hydrates may form.

BACKGROUND OF THE INVENTION

Such hydrates may form when water is in the presence of light hydrocarbons, either in the gas phase or dissolved in a liquid phase, such as a liquid hydrocarbon, and when the temperature reached by the mixture becomes lower than the thermodynamic hydrate formation temperature, this temperature being given for a given gas composition and pressure value.

Hydrate formation can be feared notably in the petroleum and gas industry where hydrate formation conditions can be met. In fact, in order to decrease the production cost of crude oil and gas, as regards investment as well as development, one of the means considered, notably in offshore production, consists in reducing or even doing away with the processings applied to the crude oil or to the gas to be transported from the reservoir to the coast, and notably in keeping all or part of the water present in the fluid to be transported. Offshore processings are generally performed on a platform situated at the surface close to the reservoir, so that the effluent, initially hot, can be processed before the thermodynamic hydrate formation conditions are reached as a result of the cooling of the effluent circulating in a pipe in indirect contact with sea water. This procedure is particularly advantageous when offshore production is performed in a zone that is difficult of access. However, the major drawback thereof lies in the risks of hydrate formation due to the presence of water.

In fact, petroleum effluents containing a gas phase and possibly a liquid phase can consist, for example, of a natural gas, a condensate gas or an associated gas mixed with crude oil. They are generally water-saturated and they may even contain free water in some cases.

During the transportation of production effluents from an underwater natural gas or oil and gas reservoir, containing water, the sea bottom temperature can be of the order of 3° or 4° C. Such a temperature leads to a fall in the temperature of the effluent produced, which can bring the latter into thermodynamic conditions favourable to the formation of hydrates, that agglomerate and block production pipes.

Hydrates are inclusion compounds formed from water and light hydrocarbons such as methane, ethane, propane, iso or n-butane. Nitrogen, as well as certain acid gases present in natural gas, such as carbon dioxide or hydrogen sulfide, can also form hydrates in the presence of water.

The formation, then the agglomeration of hydrates lead to the filling and to the clogging of transmission pipes, which eventually prevents passage of oil or gas and has extremely serious consequences. In fact, these phenomena can lead to production stops and to considerable financial losses. Furthermore, restarting the facility, notably in the case of offshore production or transportation, can be long since the decomposition of the hydrates formed is very difficult to achieve.

Conditions favourable to the formation of hydrates can also be met in the same way onshore, for pipes buried near the ground surface for example when the temperature of the ambient air is quite low, notably in northern zones such as arctic zones.

In order to avoid such drawbacks, one has tried in the prior art to use products that, added to the fluid, act as inhibitors by lowering the thermodynamic hydrate formation temperature. These are notably alcohols, such as methanol, or glycols, such as mono-, di- or triethylene glycol. This solution is very costly since the amount of inhibitors to be added can reach 10 to 50% by weight of the water content and these inhibitors are difficult to recover completely.

It has also been recommended to insulate or even to heat transmission pipes by means of a suitable device, such as described in patent application WO-90/05,260, in order to prevent too fast a cooling of the fluids transported. Such devices are nevertheless expensive and complex as far as their technical realization is concerned.

Other means consist in using radiations, for example, patent HU-18,511 teaches to send an electromagnetic wave whose frequency values and modes of propagation are selected to cause the hydrates formed to melt.

In patent SU-442,287, an ultrasonic wave is used to break the hydrate crystals and to release the trapped gas.

The use of additives capable of modifying the hydrate formation mechanism has also been described, where the hydrates formed disperse in the fluid without agglomerating and without clogging the pipes rather than quickly agglomerate with each other and form very solid plugs. The applicant's patent application EP-A-323,774 can be cited in this respect, which describes the use of non-ionic amphiphile compounds selected from the polyol and carboxylic acid esters, substituted or non-substituted, and the imide function compounds. The applicant's patent application EP-A-323,775 can also be cited, which notably describes the use of compounds belonging to the fatty acid or fatty acid derivative diethanolamides family. Patent U.S. Pat. No. 4,956,593 describes the use of surface-active compounds such as organic phosphonates, phosphate esters, phosphonic acids, their salts and their esters, organic polyphosphates and their esters, as well as polyacrylates and polyacrylamides. Patent application EP-A,457,375 describes the use of anionic surface-active compounds such as alkylsulfonic acids and their alkali metal salts. Amphiphile compounds obtained by reaction of at least one succinic derivative, selected from the group consisting of the amides and the polyalkenylsuccinic anhydrides, on at least one polyethyleneglycol monoether have also been proposed to reduce the agglomeration tendency of gas hydrates in patent application EP-A-582,507.

Methods advocating the use of dispersing chemical additives for the transportation of hydrates are interesting because of the low amounts of additives necessary to disperse the hydrate crystals in the liquid hydrocarbon phase. However, the resulting economic saving is limited on the grounds of the cost of the additive, that is higher than the cost of conventional inhibitors such as methanol or the glycols.

It is therefore advantageous and beneficial to recover and to re-use the dispersing additive at least partly.

SUMMARY OF THE INVENTION

The present invention relates to a process allowing notably to recover and to recycle at least partly a hydrate-dispersing additive. This process is thus advantageous since it decreases very substantially the dispersing additive consumption and therefore the cost of the effluent transportation operations.

Furthermore, it presents the advantage of reducing the amounts of residual additive in the oil produced, which substantially decreases the problems that may be encountered during subsequent oil processings in refining plants.

The method advocating the use of dispersing additives for the transportation of hydrates or for the reduction of their agglomeration tendency is particularly advantageous when the amount of liquid hydrocarbon phase, oil or condensate, is such that a water-in-oil emulsion may form. In fact, the liquid hydrocarbon phase serves as a carrier for the further transportation of the hydrates, in most cases in the form of a suspension, and a minimum amount of this phase is required. The water content must preferably be lower than the liquid hydrocarbon content, for example 25% or less by volume of the total volume of liquid phase.

It is thus possible to use this technique during the production of condensate gas or of oil with associated gas since, in both cases, the presence of a liquid hydrocarbon phase is certain in the production pipe, from the wellhead to the separator or to the terminal.

The hydrate-dispersing additive fed into the liquid hydrocarbon phase will then be able to disperse the water and the hydrates after the formation thereof within the liquid hydrocarbon phase, thus ensuring their transportation in the dispersed form.

The present invention takes advantage of the fact that the liquid hydrocarbon phase containing the dispersing additive can be at least partly separated and recovered. The additive used being preferably soluble in the hydrocarbon phase, it can thus be at least partly recycled, which is particularly advantageous since the additive consumption can be substantially reduced.

The present invention relates to a process for transporting in a pipe a fluid containing at least gaseous and liquid hydrocarbons and water, under conditions where hydrates may form. It is characterized in that it comprises at least the following steps:

(1) a dispersing additive in solution in a liquid hydrocarbon fraction is incorporated to said fluid to be transported, (2) the liquid and gaseous hydrocarbons are transported in the presence of water and of the hydrates possibly formed during transportation, (3) the gas phase and the excess liquid hydrocarbon phase are at least partly separated from the liquid hydrocarbon phase containing the additive and the hydrates formed, (4) the hydrates that may have formed are dissociated and the liquid hydrocarbon phase containing the additive and the dissociated hydrates is separated into an aqueous liquid phase and a liquid hydrocarbon phase containing at least partly the dispersing additive, and (5) the liquid hydrocarbon phase containing the additives from stage (4) is at least partly recycled back to a point of the pipe.

For fluids likely to generate an excess liquid hydrocarbon fraction, the liquid hydrocarbon fraction containing the additives can be separated in two stages by obtaining, at the end of the first stage, on the one hand a water-concentrated suspension or emulsion and on the other hand a liquid hydrocarbon fraction substantially cleared of water that is discharged, by separating during the second stage the water contained in the emulsion or suspension from the first stage from a liquid fraction enriched in dispersing additive and by recyling at least partly said liquid hydrocarbon fraction.

Dispersing additives such as polyol and carboxylic acid esters, substituted or non-substituted, can be used.

The polyol ester used as an additive can be formed between an alkenylsuccinic acid or anhydride and a polyalkyleneglycol; and/or between a polyisobutenylsuccinic anhydride and a polyethyleneglycol; and/or obtained by action of polyalkyleneglycol monoether and of polyisobutenylsuccinic anhydride.

The dispersing additive is for example a carboxylic acid hydroxycarbylamide, substituted or non-substituted, such as an aliphatic or cyclanic hydroxycarbylamide and/or a carboxylic acid mono- or diethanolamide containing preferably 3 to 36 carbon atoms.

An additive can be used together with a conventional thermodynamic inhibitor such as methanol or the glycols.

According to another embodiment, an additive that makes the wall of the pipe wettable by said liquid hydrocarbon fraction is fed into the pipe.

The additive added allowing to make the wall of the pipe wettable by the liquid hydrocarbon fraction can also be an anticorrosion additive.

The process according to the invention is particularly well suited for transporting hydrates in suspension in a condensate gas or in a crude oil with associated gas, the hydrates having formed during transportation.

BRIEF DESCRIPTION OF THE DRAWINGS

Other features and advantages of the present invention will be clear from reading the description hereafter, given by way of non limitative examples, with reference to the accompanying drawings in which:

FIG. 1 illustrates a flowsheet allowing the invention to be implemented,

FIG. 2 shows in detail the separation stage allowing the additive to be recycled, FIG. 3 shows an embodiment variant allowing the heat consumption to be reduced during the process.

DESCRIPTION OF THE PREFERRED EMBODIMENTS

Figure 4:
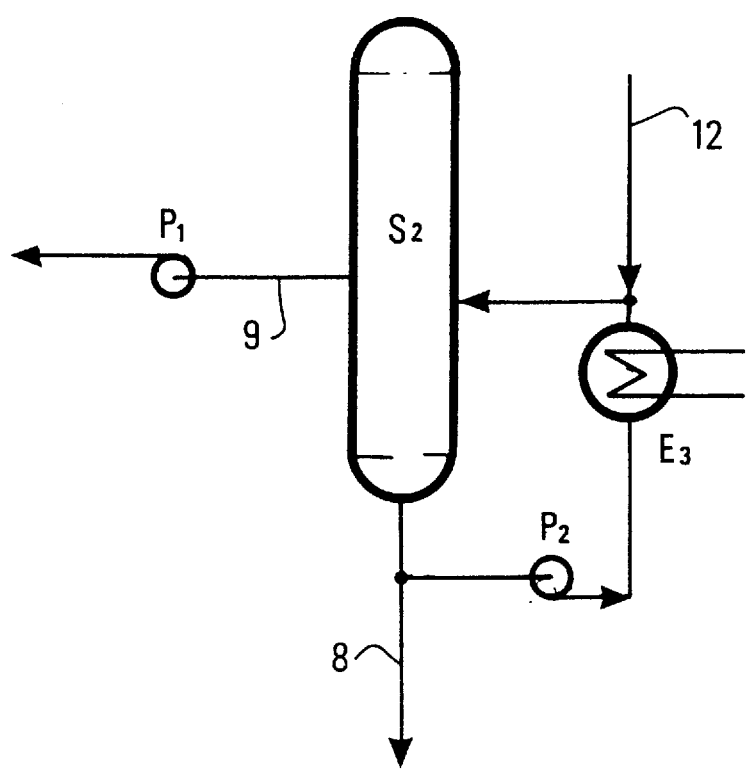
FIG. 4 shows another possibility of melting the hydrates.

The process according to the invention takes advantage of the fact that a dispersing additive is adsorbed at the surface of the hydrate crystals, which allows as a first step to separate the excess liquid hydrocarbon phase containing a small part of additive in solution, from the hydrate/liquid hydrocarbon suspension or from the water/liquid hydrocarbon emulsion in which the dispersing additive is concentrated.

After dissociation of the hydrates and/or breaking of the emulsion, it is possible to recover a liquid hydrocarbon phase containing the dispersing additive.

In order to better define the principle implemented in the process according to the invention, the example described in connection with FIG. 1, given by way of non limitative example, is applied to the transportation of a condensate gas or of an oil with associated gas.

The production effluent is discharged from the subsoil at 1 through a wellhead that can be a subsea wellhead in the case of an offshore reservoir. The wellhead is schematized in FIG. 1 by means of a valve manifold $V_1$, $V_2$, $V_3$. After coming out of the wellhead, the effluent, at a relatively high temperature of the order of 70° C. for example, passes through a pipe C in order to be transported to an onshore processing station A or to a production platform provided with the equipments commonly used for processing in the petroleum industry. During its transportation in pipe C, the effluent is progressively cooled as a result of the indirect contact of the pipe with sea water, which leads to the formation of hydrates, especially in the neighbourhood of the wall. Agglomeration of these hydrates can eventually progressively block pipe C.

In order to prevent the formation of a hydrates plug, the process according to the invention consists in feeding into a pipe 2 connected to pipe C at least at one point 3, or injection point, a dispersing additive that can be put in a liquid hydrocarbon solvent for example in a proportion of 50% by weight. The dispersing additive, optionally in concentrated solution in a solvent or a liquid hydrocarbon fraction, is injected at point 3 of the pipe and solubilizes in the liquid hydrocarbon phase consisting of the gas-saturated crude.

A sufficient amount of additive is preferably added, for example ranging between 0.1 and 4% by weight in relation to the liquid water produced, so as to maintain the aqueous phase dispersed throughout the flow. When the hydrates form, the hydrate particles are thus carried along in the two-phase flow.

In order to prevent risks of agglomeration of the hydrate particles, the dispersing additive is preferably at least partly made up of molecules that adsorb on the surface of the hydrate crystals and prevent the particles from moving closer to one another, for example by steric effect.

The effluent circulating in pipe C gets for example to a processing station A that is either onshore or on a production platform.

During the processing carried out on the effluent, the various phases that make it up can be separated, the effluent consisting notably of the gas transported, the dispersing additive and the hydrates possibly formed during transportation.

During processing, the additive is possibly at least partly recycled as described in the diagram of FIG. 2, given by way of non limitative example.

The effluent reaching A is fed into a separator $S_1$ that separates the different phases, notably the gas phase, the liquid hydrocarbon phase consisting of the crude containing the dispersing additive in solution, and that also contains the hydrates in suspension possibly formed during the transportation.

The hydrate suspension quickly decants in the lower part of separator $S_1$ and forms a denser but non-agglomerated phase consisting of the hydrate suspension concentrated in the oil or liquid hydrocarbon phase, the excess oil phase floating on the surface as a result of the gravity differences.

The gas phase is discharged through a pipe 4 situated for example in the upper part of the separator.

The supernatant oil phase is fed through a pipe 5 into a separator $S_2$ after which a gas phase coming from the oil is discharged at the top of the separator through a pipe 6 and preferably fed back through pipe 4, whereas the oil phase is discharged at the bottom of the separator through a pipe 7.

The hydrate suspension that is in the lower part of separator $S_1$ is discharged through a pipe 8 towards a first exchanger $E_1$ where the hydrates are melted and the water/oil emulsion likely to form after dissociation of the hydrates is broken. After leaving this exchanger $E_1$, the different phases obtained are fed into a separator $S_3$ and separated. The gas phase is thereafter discharged through a pipe 9 prior to being fed back for example through pipe 4, the aqueous phase or the water is discharged through a pipe 10 preferably situated at the bottom of the separator, and the oil phase that contains a large part of the dispersing additive, the latter being preferably soluble in oil, is discharged through a pipe 11 and possibly recompressed by a pump $P_1$ positioned on the pipe and recycled through pipe 2 to a point of transmission pipe C, for example at the head of pipe C.

Fusion of the hydrates is performed for example at a temperature ranging between 30° and 100° C. and preferably between 50° and 80° C.

Makeup dispersing additive, possibly in solution in a liquid hydrocarbon fraction, intended to compensate for possible losses, can be fed through pipe 12 that can be connected to an auxiliary source.

According to another mode of implementation of the process, it is possible to dissociate the hydrates coming from pipe C in separator $S_1$, wholly or partly, for example by setting such pressure and temperature conditions that the hydrates formed are unstable.

A water-in-oil emulsion is then obtained, that decants progressively in the bottom of separator $S_1$, and the temperature must be selected to avoid breaking the emulsion. The dispersing additive is then preferably in this emulsified phase. According to this pattern, it is the emulsion that is discharged through pipe 8, heated in exchanger $E_1$ so as to break it and fed into separator $S_3$ that separates the phases obtained, an aqueous phase that is discharged through pipe 10 and an oil or liquid hydrocarbon phase containing a large part of the dispersing additive that is discharged through pipe 11 prior to being recompressed by pump $P_1$ in order to be recycled into pipe 2.

Makeup additive can also be added in this embodiment as described above.

According to an advantageous embodiment of the invention, the heat consumption in exchanger $E_1$ can be reduced.

FIG. 3 shows a pattern allowing the liquid hydrocarbon fraction discharged through pipe 9 to be thermally exchanged with the mixture discharged through pipe 5 in an exchanger $E_2$ situated before exchanger $E_1$. During this exchange, the liquid hydrocarbon fraction gives part of its heat up to the effluent discharged through pipe 5. After passing through exchanger $E_2$, this cooled liquid hydrocarbon fraction is recompressed by pump $P_1$ and recycled through pipe 2, for example, to the top of pipe C.

Various means can be used to improve the performances of the different separation and recycling stages performed. In the case of the example illustrated in FIG. 3, a concentrated suspension of hydrate particles is obtained by simple decantation in separator $S_1$. It is also possible to implement other known methods for concentrating a suspension such as, for example, passing through a cyclone, centrifugation, filtration and notably tangential filtration.

It is also possible to concentrate this suspension by heating so as to vaporize the hydrocarbon fraction that is to be discharged with the gas.

The heating performed in exchanger $E_1$, in the case of the examples illustrated by FIGS. 1, 2, 3, allows to melt the hydrate crystals and facilitates the separation of the emulsion by temperature rise. This heating can be achieved with other means than those illustrated in FIGS. 1, 2 and 3. It is notably possible to supply the necessary heat by not heating directly the suspension and by heating a fraction of one the fluids obtained after separation, that is recirculated.

Thus, for example, as shown in the embodiment illustrated by FIG. 4, the suspension flowing in through pipe 12 can be mixed with an aqueous phase fraction coming from separator $S_2$, recirculated by means of pump $P_2$ and heated in exchanger $E_3$. This design notably presents the advantage of facilitating the design of the heating exchanger and of reducing the surface thereof thanks to the good heat transfer properties of water.

In the case of the examples illustrated in FIGS. 1, 2 and 3, the two phases forming the emulsion are separated in the separator by simple decantation. Various well-known methods can be implemented in order to facilitate this separation passing through a coalescent bed, centrifugation, passing through a cyclone, membrane techniques, electrocoalescence. This separation can also be facilitated by adding a demulsifying additive.

Without departing from the scope of the invention, the separation stages described above can be carried out in a single device combining functions substantially identical to those obtained with the assembly comprising separators $S_1$, $S_2$ and exchanger $E_1$.

In all the embodiments described above, the additives can be selected from the additives that are commonly used for inhibiting the formation of hydrates and/or the agglomeration thereof.

The dispersing additive can be, for example, a non-ionic surfactant selected from hydrogenated amidic compounds described in the applicant's patent EP-A-323,775.

The synthesis of these hydroxycarbylamides can be achieved from fatty acids, esters of these fatty acids, vegetable or animal oils or fats, by reacting these compounds with hydroxycarbylamines such as diethanolamine or monoethanolamine. What is referred to as "hydroxycarbyl" is a hydrocarbyl radical substituted by at least one hydroxy group.

The carboxylic acids of the amides can be saturated or unsaturated linear acids, present as they are or in admixture in bonded form in the oils, the esters, in the mixture of fatty acids serving as base material for the amides. The commonest usable oils are for example colza, copra, sunflower oils, . . .

The carboxylic acids of the amides can be hydroxycarboxylic acids, such as ricinoleic acid, or estolides such as ricinoleic acid estolides.

The carboxylic acids can be diacids or triacids corresponding to the dimers and the trimers of the fatty acids or to dicarboxylic acids such as dodecanedioic acid.

The amines used with the carboxylic acids for the synthesis of the amides are for example alkanolamines or amine diols, such as diethanolamine, diisopropanolamine or trihydroxymethylaminomethane.

The amides can be carboxylic acid mono- or diethanolamides and can contain 3 to 36 carbon atoms.

The dispersing additive can be, for example, a non-ionic amphiphile compound selected from the polyol esters, substituted or non-substituted, such as those described in the applicant's patent EP-A-323,774.

These esters can be obtained from linear or non-linear (for example branched) carboxylic acids, saturated or unsaturated, corresponding for example to the fatty acids contained in vegetable and animal oils or fats, such as for example lauric, palmitic, stearic acids for the saturated acids or palmitoleic, oleic, linoleic acids for the unsaturated acids.

The carboxylic acids can also be diacids or triacids, corresponding to the dimers or trimers of the fatty acids, or dicarboxylic acids, such as for example dodecanedioic acid for which one of the acid functions can be free.

The carboxylic acids can be hydroxycarboxylic acids such as ricinoleic acid.

The carboxylic acids can have the form of polymers such as the estolized acids obtained from the castor-bean plant.

The polyol esters can be obtained from alkenylsuccinic acid or from alkenylsuccinic anhydride. The alkenyl group of the acid or of the anhydride can derive from a polymer of a mono-olefin containing 2 to 5 carbon atoms. This polymer can be, more specifically, a polyisobutene in which the alkenyl group has an average molecular weight of 300 to 5000.

The polyols considered are for example:
diols, such as ethyleneglycol, the polyalkyleneglycols, such as polyethyleneglycol or polypropyleneglycol, or neopentylglycol,
triols, such as glycerol or trimethylolpropane,
tetrols, such as pentaerythritol, erythritol,
polyols, such as sorbitol, mannitol, the polyglycerols, or sugars such as saccharose, glucose, fructose or derivatives of these various products such as starch.

The dispersing additive can also be a non-ionic amphiphile compound obtained by reaction of at least one succinic derivative selected from the group consisting of the polyalkenylsuccinic acids and anhydrides, on at least one polyethyleneglycol monoether such as those described in the applicant's patent EP-A-582,507.

The succinic derivatives used to prepare the compounds used in the invention are for example obtained by action of at least one olefin or of a chlorinated hydrocarbon on maleic acid or anhydride. The olefin or the chlorinated hydrocarbon used in this synthesis can be linear or branched, and contain usually 10 to 200 carbon atoms, preferably 15 to 150 carbon atoms and most often 20 to 100 carbon atoms in their molecule. This olefin can also be an oligomer, for example a dimer, a trimer or a tetramer, or a polymer of a lower olefin, having for example 2 to 12 carbon atoms, such as ethylene, propylene, isobutene. The chlorinated hydrocarbon can be obtained from the chlorination of such polymers.

The polyethyleneglycol monoethers used to prepare the compounds used in the invention usually have a number average molar mass ranging between 100 and 6000, and they meet the general formula as follows

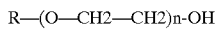

R—(O—CH2—CH2)n-OH where R is a hydrocarbon-containing group having for example 1 to 30 carbon atoms and n, representing the degree of polymerization, has a value ranging between 2 and 140.

The hydrocarbon phase can be at least partly separated and recycled. The additive used being preferably soluble in the hydrocarbon phase, it can thus be at least partly recycled, which is particularly advantageous since the additive consumption can be very substantially reduced.

According to a preferred embodiment, the formation of hydrate crystals on the wall, i.e. likely to adhere to the wall and not to be carried along by the flow, is prevented. To that effect, the wall of the pipe is for example made wettable by the liquid hydrocarbon fraction and non-wettable by water by incorporating for example to the liquid hydrocarbon fraction an additive that adsorbs on the wall while covering the latter with oleophilic functional groups.

This additive can advantageously consist of an anticorrosion additive which simultaneously allows to protect the pipe against corrosion and against risks of clogging by the hydrates.

It can also consist of a mixture of additives, and what is referred to as a dispersing additive hereafter is either a single additive or a mixture of additives.

It is also possible to make the wall of the pipe from a material wettable by the liquid hydrocarbon fraction or to use an inner lining, for example Teflon, reducing the risk of adhesion of the hydrates to the wall.

This mixture of hydrocarbons in the liquid phase can be a condensate such as those obtained upon the production of condensate gases. It can also be a crude oil distillation cut. It contains hydrocarbons whose number of carbon atoms ranges for example between 5 and 30 and preferably between 5 and 20.

This invention mainly applies to the transportation of hydrates formed from water and gas, notably in a condensate gas or an oil with associated gas. This gas, that can be natural gas, petroleum gas or any other gas, can notably contain for example methane, ethane, ethylene, propane, propene, n-butane, i-butane, $H_2S$, $CO_2$ or nitrogen.

We claim:

1. A process for transporting a fluid, wherein the fluid to be transported contains a gaseous hydrocarbon phase, a liquid hydrocarbon phase and water, the water content being less than the liquid hydrocarbon phase content, comprising the steps of:

1) adding a dispersive additive in a hydrocarbon solution to the fluid to be transported, so as to form a suspension or emulsion and disperse hydrates into a dispersed form,
 2) transporting the fluid to be transported comprising the liquid hydrocarbon phase, and the gaseous hydrocarbon phase in the presence of water and the hydrates in dispersed form,
 3) separating the gaseous hydrocarbon phase, a suspension comprising the dispersed hydrates, the dispersing additive and water suspended in a part of the liquid hydrocarbon phase, and liquid hydrocarbon phase not in suspension,
 4) further separating the liquid hydrocarbon phase and the dispersing additive from the suspension by a) dissociating the hydrates in dispersed form in order to form a water-in-oil emulsion, the dispersing additive being solved in the liquid hydrocarbon phase, and b) breaking the water-in-oil emulsion so as to obtain a water phase and a liquid hydrocarbon phase comprising the dispersing additive, and c) separating the water phase from the liquid hydrocarbon phase comprising the dispersing additive, and
 5) recycling at least part of the liquid hydrocarbon phase comprising the dispersing additive from step 4, to a point in the pipe.

2. A process as claimed in claim 1, wherein the dispersing additive is selected from the group consisting of polyol carboxylic acid esters, and substituted polyol carboxylic acid esters.

3. A process as claimed in claim 2, wherein said polyol carboxylic acid esters are formed by the reaction of at least one of an alkenylsuccinic acid or anhydride and a polyalkyleneglycol; a polyisobutenylsuccinic anhydride and a polyethyleneglycol; or of a polyalkyleneglycol monoether and polyisobutenylsuccinic anhydride.

4. A process as claimed in claim 1, wherein the dispersing additive is a carboxylic acid hydroxycarbylamideor or a substituted carboxylic acid hydroxvcarbylamide.

5. A process as claimed in claim 1, wherein an dispersing additive further comprises a conventional thermodynamic inhibitor selected from the group consisting of methanol and glycols.

6. A process as claimed in claim 1, wherein an additive which provides for wetting of liquid hydrocarbon phase to the wall of the pipe is fed into the pipe.

7. A process as claimed in claim 6, wherein the additive which provides for wetting of the liquid hydrocarbon phase is an anticorrosion additive.

8. Application of the process as claimed in claim 1, wherein the hydrates are in the form of a suspension contained in a condensate gas or in a suspension contained in a crude oil with associated gas.

9. Process as claimed in claim 1, wherein the step 4 is processed with a temperature in the range 30°–100° C.

10. Process as claimed in claim 9, wherein the step 4 is processed with a temperature in the range of 50°–80° C.

11. Process as claimed in claim 1, wherein the liquid hydrocarbon phase comprising the hydrates and the dispersive additives is heated so as to dissociate the hydrates and obtain a water-in-oil emulsion, the emulsion being separated from the gas phase and the excess hydrocarbon phase in a first separator and broken in a second separator by heating to recover a gas phase, an aqueous phase and a hydrocarbon liquid phase comprising the additive.

12. Process as claimed in claim 1, wherein the steps 4*a* and *b* are performed in two different separators, a first separator and a second separator; the liquid hydrocarbon phase suspension containing the hydrates and the dispersing additive being separated from the liquid hydrocarbon phase not in suspension and the gaseous hydrocarbon phase in the first separator, and sent to the second separator, heated to dissociate the hydrates and the emulsion, wherein the liquid hydrocarbon phase containing the additive obtained is separated from the gaseous phase and the water phase.

13. A process as claimed in claim 4, wherein the carboxylic acid hydroxycarbylamide or substituted carboxylic acid hydroxycarbylamide is selected from the group consisting of an aliphatic hydroxycarbylamide, a cyclanic hydroxycarbylamide, an carboxylic acid ethanolamide containing 3 to 36 carbon atoms and an carboxylic acid diethanolamide containing 3 to 36 carbon atoms.

* * * * *